March 3, 1959  V. PACETTI  2,875,706
CRADLE CAR
Filed April 13, 1954  3 Sheets-Sheet 1

Veto Pacetti
INVENTOR.

March 3, 1959  V. PACETTI  2,875,706
CRADLE CAR
Filed April 13, 1954   3 Sheets-Sheet 2
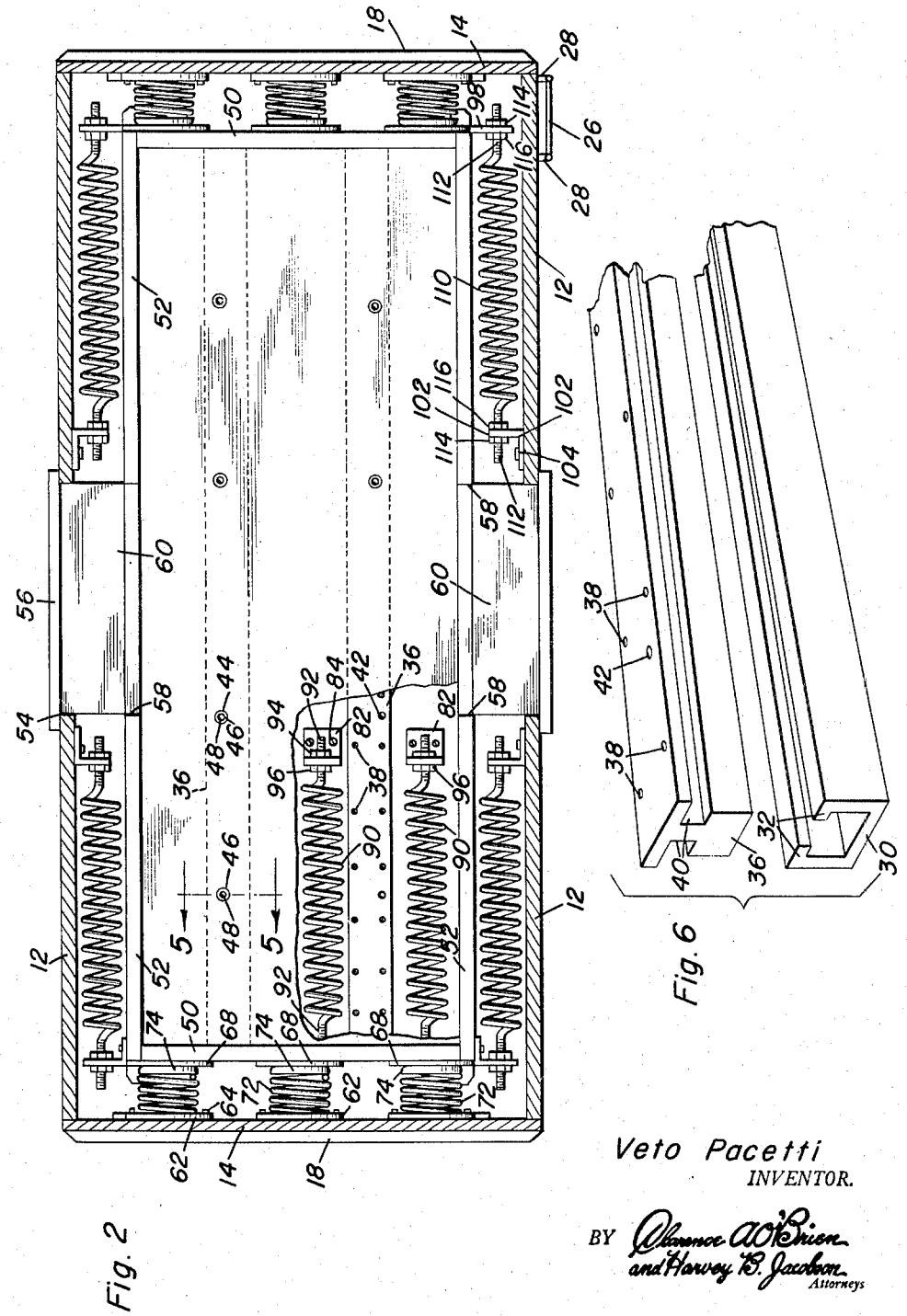
Veto Pacetti
INVENTOR.

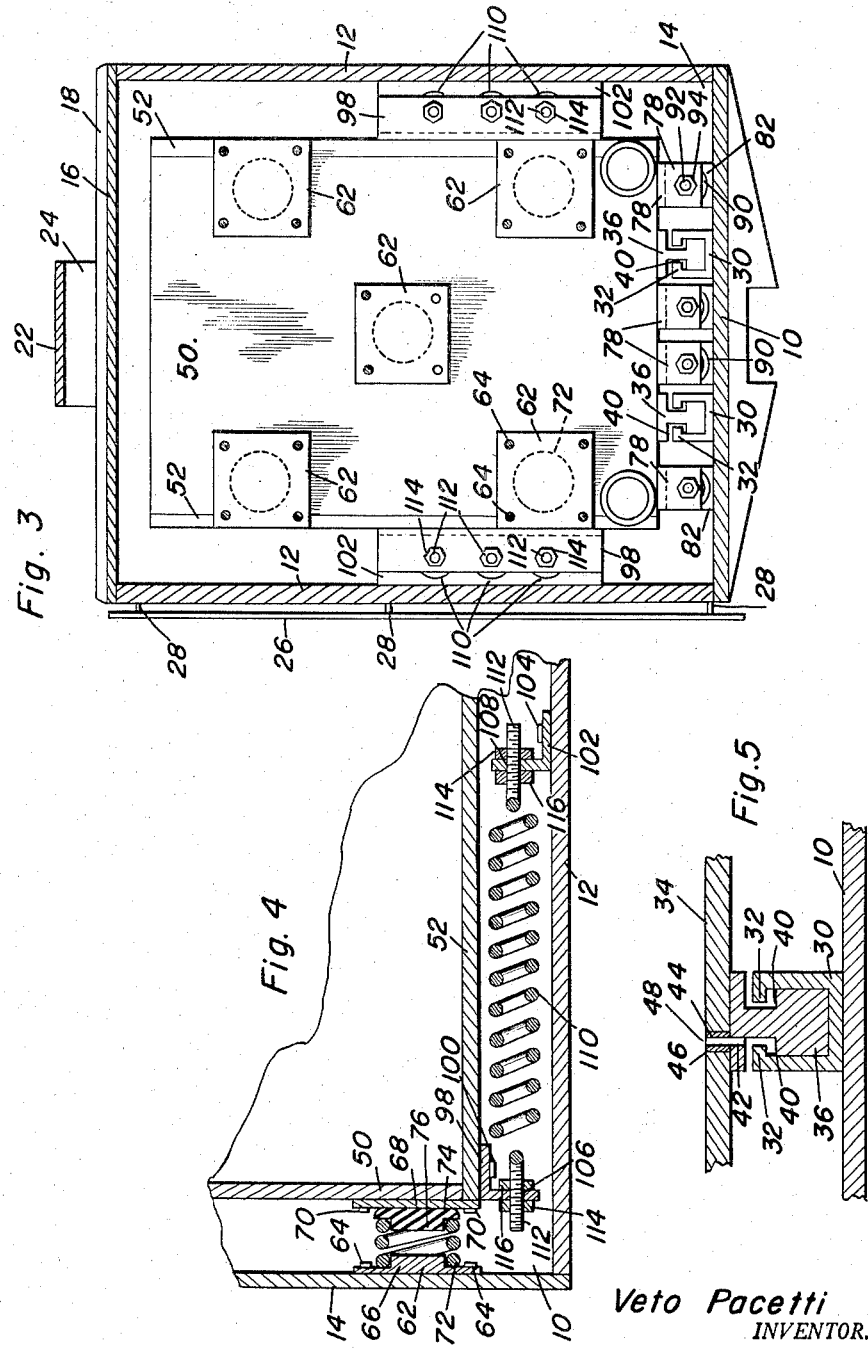

United States Patent Office 2,875,706
Patented Mar. 3, 1959

2,875,706

CRADLE CAR

Veto Pacetti, Dearborn, Mich.

Application April 13, 1954, Serial No. 422,958

2 Claims. (Cl. 105—374)

This invention relates to a cradle car and more particularly to a freight car which will absorb the shocks incidental to the movement of the train in which the car is embodied.

An object of this invention is to provide a cradle car wherein a platform is mounted for reciprocation within a freight car by novel means.

Another object of this invention is to provide a cradle car having novel means for resiliently maintaining the platform thereof in a central position within the main car body.

A further object of this invention is to provide a cradle car wherein novel means are provided therein for preventing damage to the resilient means which maintains the platform in a central position in a car body.

A yet further object of this invention is to provide a cradle car wherein the resilient means for retaining the platform in a central position in the car body can be adjusted to vary the amount of shock necessary to displace the platform from its central position.

A still further object of this invention is to provide a cradle car having the above characteristics which is simple and efficient in construction, and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a sectional view taken substantially along the section line 2—2 of Figure 1;

Figure 3 is a sectional view taken substantially along the section line 3—3 of Figure 1;

Figure 4 is an enlarged sectional view taken substantially along the section line 4—4 of Figure 1;

Figure 5 is an enlarged sectional view taken substantially through the section line 5—5 of Figure 2; and Figure 6 is an enlarged exploded perspective view of the rail and channel for mounting the platform within the car body.

Figure 1:
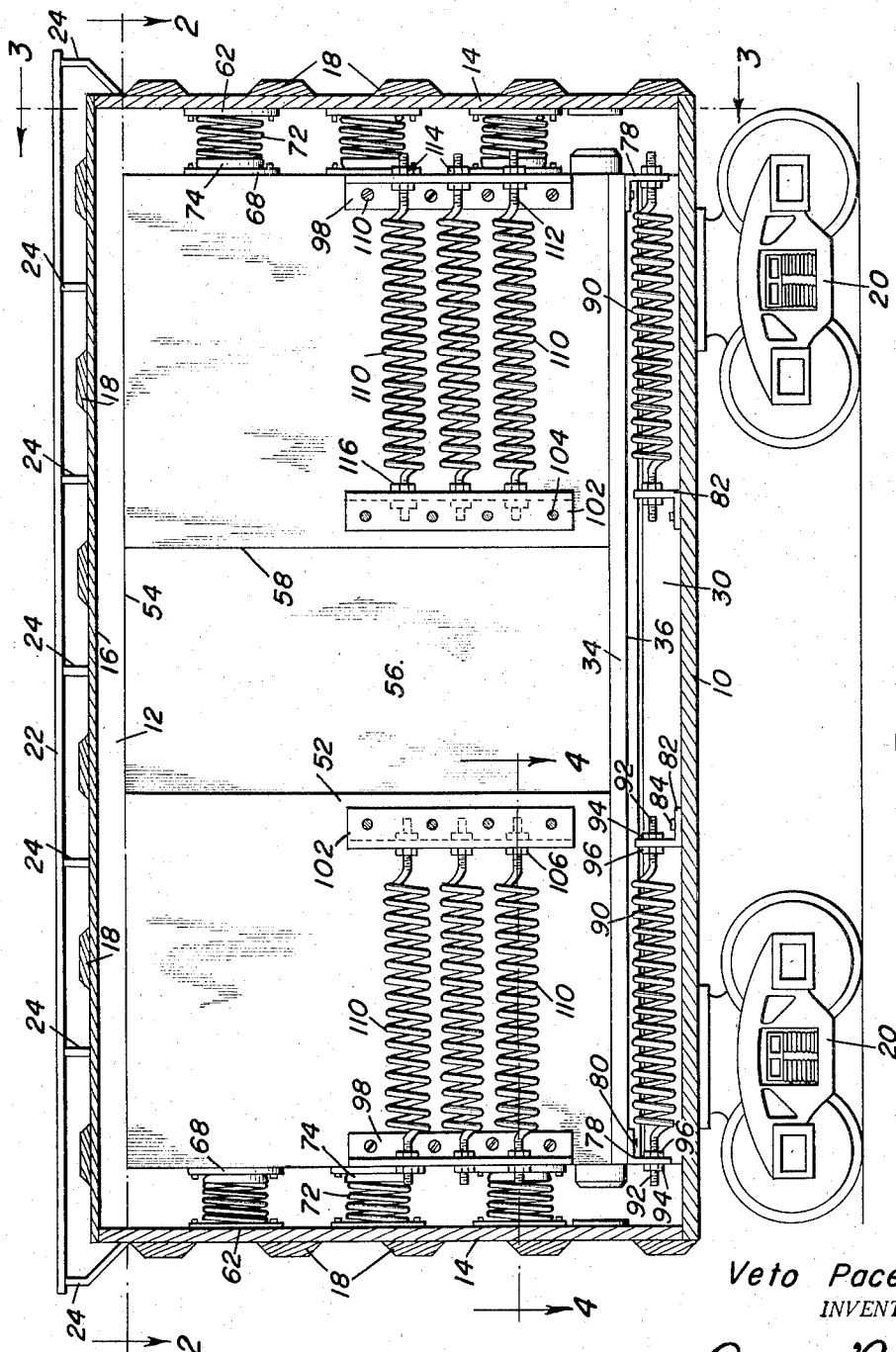
Figure 1 is a vertical sectional view of a cradle car forming the subject of this invention.

Referring now more particularly to the accompanying drawing it will be seen that the improved cradle, forming the subject of this invention includes, a freight car having a car body formed on a bottom 10, side walls 12 and end walls 14. A suitable roof 16 is provided on the car body and suitable brace members 18 are mounted on the roof 16 and the end walls 14 and extend transverse to the direction to movement of the car body. Conventional trucks 20 are secured to the floor 10 for supporting the car body for movement on rails.

A conventional platform 22 is mounted in position by means of braces 24 upon the roof 16. The platform 22 extends longitudinally of the roof 16 and substantially centrally thereof. A conventional ladder 26 is secured to one side 12 of the car body by means of suitable braces 28. This type of construction is conventional in freight cars.

Fixedly secured to the floor 10 and extending longitudinally within the car body are a pair of spaced parallel channel members 30. The channel members 30 are provided with inwardly extending flanges 32 at the upper end thereof so as to provide a restricted opening extending longitudinally thereof and opening upwardly therefrom. A platform having a floor 34 is adapted to be positioned within the car body and is of a length shorter than the length of the floor 10. A pair of rails 36 are provided with suitable apertures 38 for attaching the same to the lowest face of the platform floor 34. Any suitable fasteners may be inserted through the apertures 38 for securing the rails 36 to the floor 34. The main portion of the rails 36 is of a width substantially equal to the opening in the channel 30. The rail 36 is provided with a longitudinally extending cut-out portion 40 along each side thereof which receives the flanges 32 of the channel member 30. Thus, it will be seen that the floor 34 is capable of longitudinal movement with respect to the car body but is prevented from having vertical movement with respect thereto.

The rail 36 is further provided with a plurality of apertures 42 extending therethrough and intersecting the cut-out portions 40. The floor 34 is likewise provided with a plurality of apertures 44 which receive therein bushings 46 which are provided with a central opening 48. The central openings 48 are in alignment with the apertures 42 in the rail 36 whereby a suitable lubricant may be inserted through the apertures 48 and apertures 42 into the cut-out portions 40 for providing a means for reducing the friction between the members when the platform is moved with respect to the car body.

Secured to the floor 34 of the platform and extending upwardly therefrom are end walls 50 and side walls 52. The side walls 12 of the car body are provided with a central opening 54 which is closed by a conventional door 56. The side walls 52 of the platform are provided with a central opening 58 which is in registry with the opening 54 in the car body. If desired, the platform 60 may be provided in the car body adjacent the opening 54 to provide a portion between the door 56 and the floor 34 which is at the same height as the floor 34.

In order to position the platform centrally of the car body and to resiliently maintain the platform in this central position means are provided for resiliently mounting the platform in the car body. This means includes a plurality of plates 62 which are secured to the end walls 14 of the car body by means of suitable fasteners 64. The central portion of the plate 62 is raised as at 66 as seen in Figure 4. Secured to the end walls 50 of the platform are a plurality of plates 68 by means of suitable fasteners 70. The plates 68 are substantially the same area as the plates 62 and are in alignment with the plates 62. A coil spring 72 is provided between the plates 62 and 68 with the raised portion 66 of the plate 62 received centrally within the coil spring 72. A rubber cushion 74 having a raised central portion 76 is mounted at the other end of the coil spring 72 and has the outer extremities thereof received between the coil spring 72 and the plate 68. A plurality of plates 62 and 68 and springs 72 are disposed between each end of the platform and the end walls 14 of the car. Thus, it will be seen that when shocks are imparted to the car during the movement of the car on a train the coil springs 72 will take up the shock to reduce damage to the material carried therein.

Additional means are provided for maintaining the platform centrally of the car body. This means comprises a plurality of angle brackets 78 secured to the floor 34 adjacent each end by means of fasteners 80.

The floor 10 is provided with a plurality of angle brackets 82 secured thereto and extending upwardly therefrom by means of fasteners 84. The brackets 82 are in alignment with the brackets 78 and are disposed on opposite sides of the rails 32. The brackets 82 are positioned midway between the ends of the floor 10.

An elongated spring 90 is provided with aligned externally threaded portions 92 at opposite ends thereof. The aligned portions 92 are adapted to be received within apertures in brackets 78 and 82 and to have positioned thereon lock nuts 94 and 96 whereby the tension exerted by the springs 90 may be adjusted. A plurality of these springs are secured to each end of the platform and extend toward the center of the floor 10.

Similar resilient means are secured between the sides of the platform and car body. This means comprises a plurality of elongated angle brackets 98 secured to the ends of the side walls 52 in a vertical position by means of fasteners 100. A similar elongated angle bracket 102 is mounted to the side walls of the car body adjacent the openings 54 by means of suitable fasteners 104. The brackets 98 and 102 are in alignment with each other and are provided with a plurality of aligned apertures 106 and 108. An elongated spring 110 is provided with aligned end portions 112 which are externally threaded and are received within the aligned apertures 106 and 108. Suitable lock nuts 114 and 116 are provided on the threaded portions 112 of the spring 110 for adjusting the tension thereof.

In practical use of the device, the channel 30 together with platform 34 and rail 36 are mounted within a freight car on the floor thereof. Then, the springs 72 and their associated plates 62 and 68 are mounted in position between the end walls 50 of the platform and the end walls 14 of the car body. Then, the springs 90 and 110 are mounted in position on their associated brackets and the suitable lock nuts are tightened to the desired tension. Then, after the freight car has been loaded and the train is moving in the event of a sudden stop the entire platform will shift against the action of the springs and be cushioned thereby.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a vehicle body including top, bottom, side and end walls, and openings for ingress and egress in said side walls; a shock-absorbing and self-centering cradle in said vehicle body, said cradle including a floor located above the bottom of the vehicle and peripherally inwardly spaced from the outer edges of said vehicle bottom, to provide a peripheral space between said edges of said body bottom and the edges of said floor, side and end walls secured to the peripheral edges of the floor of the cradle, said side and end walls terminating below the top of the vehicle body, the side walls of said cradle including openings for ingress and egress therein in substantial alignment with the similar openings in the side walls of the vehicle body, a plurality of parallel upwardly opening cradle floor supporting channels secured to the upper surface of the vehicle bottom and extending longitudinally thereon, said channels including upwardly extending flange portions whose upper edges extend inwardly toward each other, a plurality of parallel downwardly extending rail members secured to said bottom and disposed within the peripheral limits of the bottom of the floor of the cradle, said rails being reciprocably mounted in the channel members for supporting the cradle in spaced relation to the vehicle body bottom, said rail members including portions cooperating with the inwardly directed flange portions of the channel members for limiting upward movement of the cradle, a plurality of coil spring assemblies each including a cushion element mounted in the space between and reacting on the end walls of the vehicle body and cradle, tension spring means longitudinally disposed in the space between the side walls and the bottom and floor, respectively, of the vehicle and cradle, said spring means having portions secured respectively to the vehicle and cradle for maintaining the respective openings in the cradle and vehicle body in alignment and tending to absorb the impact of such shock to the vehicle body, and means connected with said spring means for adjusting the tension of said spring means.

2. In a vehicle body as set forth in claim 1 wherein said adjustable tension spring means comprises a plurality of symmetrically disposed opposing spring assemblies including pairs of transverse opposed bracket elements extending into the space between the side walls, bottom and floor, respectively, of the vehicle and cradle, one of the bracket elements of each pair of the bracket elements being secured to the vehicle and the other of such pair being secured to the cradle, each of the pairs of bracket elements including mutually aligned apertures, and adjustable tension spring members extending through the apertures of said bracket elements and adjustable in cooperation therewith.

References Cited in the file of this patent

UNITED STATES PATENTS

| | | |
|---|---|---|
| 514,196 | Le Grand | Feb. 6, 1894 |
| 1,081,853 | Miller | Dec. 16, 1913 |
| 1,084,477 | Peterson | Jan. 13, 1914 |
| 1,097,961 | Allyn et al. | May 26, 1914 |
| 1,132,876 | Peterson et al. | Mar. 23, 1915 |
| 1,841,417 | Murphy | Jan. 19, 1932 |
| 1,969,844 | Heath | Aug. 14, 1934 |
| 2,040,486 | Kellett | May 12, 1936 |
| 2,047,955 | Fitch | July 21, 1936 |
| 2,155,533 | Dwyer | Apr. 25, 1939 |